US009003222B2

(12) United States Patent
Bhamidipaty et al.

(10) Patent No.: US 9,003,222 B2
(45) Date of Patent: Apr. 7, 2015

(54) CONFIGURATION FAULT LOCALIZATION IN SHARED RESOURCE ENVIRONMENTS

(75) Inventors: Anuradha Bhamidipaty, Bangalore (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/249,988

(22) Filed: Sep. 30, 2011

(65) Prior Publication Data

US 2013/0086434 A1    Apr. 4, 2013

(51) Int. Cl.
*G06F 11/00* (2006.01)
*G06F 11/30* (2006.01)

(52) U.S. Cl.
CPC .......... *G06F 11/302* (2013.01); *G06F 11/3051* (2013.01)

(58) Field of Classification Search
USPC .............................................. 714/3, 2, 25, 48
See application file for complete search history.

(56) References Cited

U.S. PATENT DOCUMENTS

| 6,665,262 | B1 | 12/2003 | Lindskog et al. |
| 6,823,472 | B1* | 11/2004 | DeKoning et al. ............... 714/10 |
| 7,096,459 | B2 | 8/2006 | Keller et al. |
| 7,100,095 | B2 | 8/2006 | Godse et al. |
| 7,469,279 | B1 | 12/2008 | Stamler et al. |
| 7,890,807 | B2 | 2/2011 | Verbowski et al. |
| 2003/0237017 | A1 | 12/2003 | Jibbe |
| 2007/0300103 | A1* | 12/2007 | Verbowski et al. ............. 714/37 |
| 2008/0082951 | A1* | 4/2008 | Hu ................................. 716/17 |
| 2009/0177912 | A1* | 7/2009 | Reblewski ........................ 714/3 |
| 2010/0023604 | A1 | 1/2010 | Verma et al. |
| 2011/0099428 | A1 | 4/2011 | Stenberg et al. |
| 2011/0161740 | A1* | 6/2011 | Sonoda et al. .................. 714/40 |
| 2011/0213753 | A1* | 9/2011 | Manmohan ................... 707/640 |
| 2012/0102369 | A1* | 4/2012 | Hiltunen et al. ................ 714/48 |

OTHER PUBLICATIONS

Hanemann, Andreas, et al., "A Framework for Service Quality Assurance using Event Correlation Techniques", Proceedings of the Advanced Industrial Conference on Telecommunications / Service Assurance with Partial and Intermittent Resources Conference / E-Learning on Telecommunications Workshop (AICT / SAPIR / ELETE 2005), Jul. 17-22, 2005, 6 pages, IEEE Computer Society, Lisbon, Portugal.
Wang, Yan, et al., "Dynamic Case Based Reasoning in Fault Diagnosis and Prognosis", 14th IEEE International Conference on Fuzzy Systems, May 25, 2005, pp. 845-850, IEEE Comuter Society, Reno, Nevada, USA.

* cited by examiner

*Primary Examiner* — Sarai Butler
(74) *Attorney, Agent, or Firm* — Ference & Associates LLC

(57) ABSTRACT

Methods and arrangements for fault localization. Structural clusters for an environment are received, and configuration parameters and dependencies for components in the structural clusters are identified. A configuration map is built, and a configuration fault occurrence is ascertained.

23 Claims, 12 Drawing Sheets context ds : Datasource
inv: DBName = ds.pointsTo.Name
inv: DBPort = ds.pointsTo.configuredOn.Port
inv: DBIP = ds.pointsTo.configuredOn.runsOn.installedOn.IP
inv: ConfiguredOn = AppServer

Relationship ds : Datasource.jbdc:: jdb connection pool
inv: ds.DBName = jdbc.DataBase
inv: ds.DBPort = jdbc.Port
inv: ds.DBIP =jdbc.server
inv: ds.ConfiguredOn = AppServer
inv: jdbc.ConfiguredOn=ApplicationServer

1: Let N be the number of nodes in a graph
2: Total number of combination possible among N nodes is given by: $^NC_1 + {^NC_2} + \ldots + {^NC_N} = 2^N - 1$
3: S be the set of all possible combination of nodes in G.
4: for $p(V, E) \in S$ do
5:   if $p(V, E) ==$ connected then
6:     $p(V, E)$ is a subgraph
7:   end if
8: end for

FIG. 6

CONFIGURATION FAULT LOCALIZATION IN SHARED RESOURCE ENVIRONMENTS

BACKGROUND

Generally, configuration fault localization involves identifying faults in the configuration of a component (or components) that is/are the source of failure given a set of observed failure indications. Configuration faults are harder to detect than on/off failures, as it involves analysis of the parameters that constitute the configuration.

Configuration faults are widely prevalent and continue to present significant challenges, especially given the complexity of current distributed environments. Conventional techniques for localizing configuration faults are heavily reliant on resource dependency information and tightly coupled to event correlation techniques which suffer from limited availability of granular event data. As dedicated resource environments evolve into shared resource models in cloud computing, the complexity of the problem grows considerably due to an increase in system size that creates a considerable increase in events.

BRIEF SUMMARY

In summary, one aspect of the invention provides a method comprising: receiving structural clusters for an environment; identifying configuration parameters and dependencies for components in the structural clusters; building a configuration map; and ascertaining a configuration fault occurrence.

Another aspect of the invention provides an apparatus comprising: at least one processor; and a computer readable storage medium having computer readable program code embodied therewith and executable by the at least one processor, the computer readable program code comprising: computer readable program code configured to receive structural clusters for an environment; computer readable program code configured to identify configuration parameters and dependencies for components in the structural clusters; computer readable program code configured to build a configuration map; and computer readable program code configured to ascertain a configuration fault occurrence.

An additional aspect of the invention provides a computer program product comprising: a computer readable storage medium having computer readable program code embodied therewith, the computer readable program code comprising: computer readable program code configured to receive structural clusters for an environment; computer readable program code configured to identify configuration parameters and dependencies for components in the structural clusters; computer readable program code configured to build a configuration map; and computer readable program code configured to ascertain a configuration fault occurrence.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4 provides an example of constraints.

FIG. 5 provides an example of a relationship between configuration nodes.

FIG. 6 provides a two-stage algorithm for determining subgraphs of a graph.

DETAILED DESCRIPTION

Figure 1:
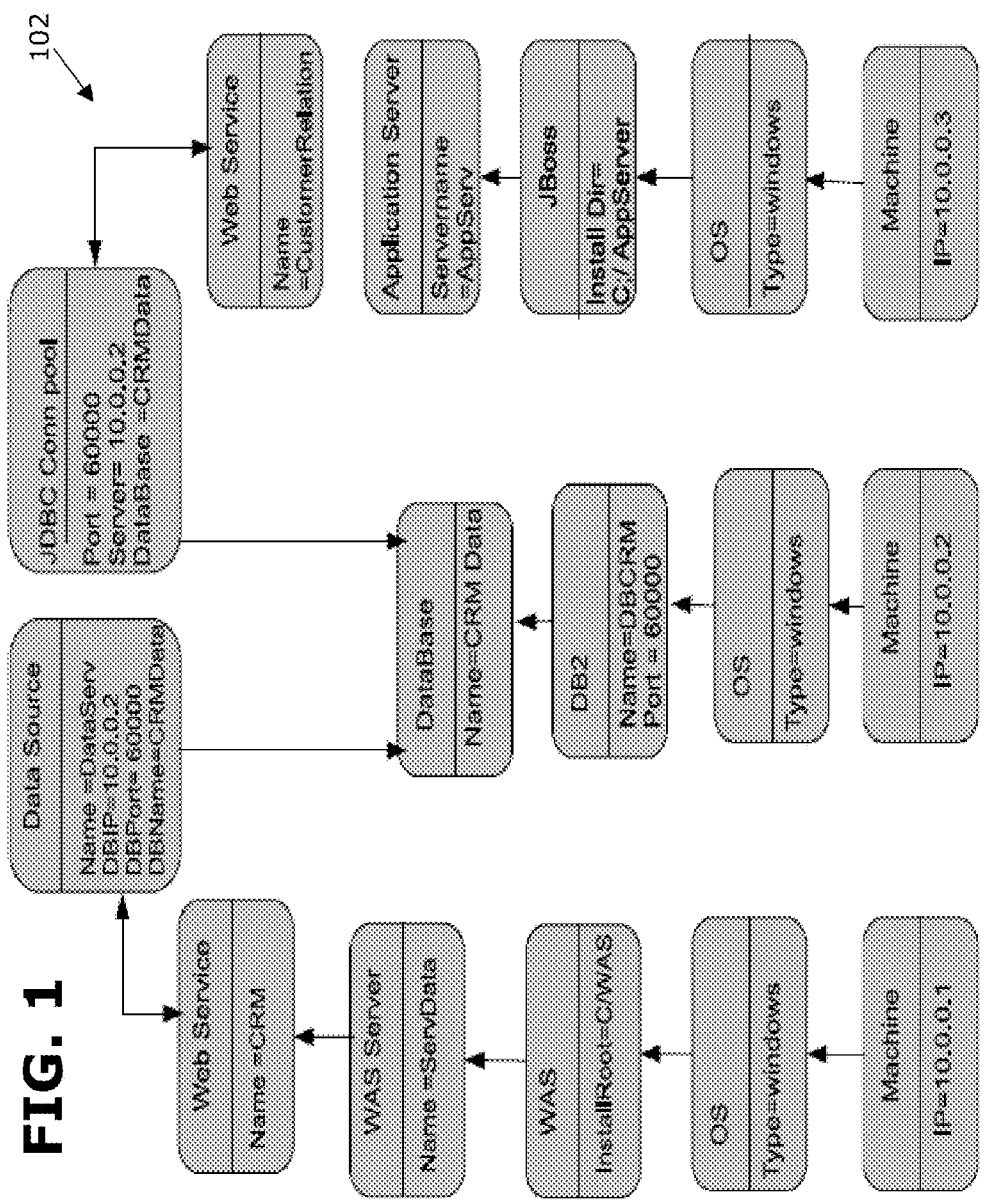
FIG. 1 schematically illustrates a sample configuration of two applications to a shared resource.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The disclosure now turns to FIGS. 1-7. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 9. In accordance with an example embodiment, most if not all of the process steps, components and outputs discussed with respect to FIGS. 1-7 can be performed or utilized by way of a processing unit or units and system memory such as those indicated, respectively, at 16' and 28' in FIG. 9, whether on a server computer, a client computer, a node computer in a distributed network, or any combination thereof.

In accordance with at least one embodiment of the invention, it should be understood that configurations are performed by setting values for configuration parameters and represented as a <name, value> pair. A configuration state is the current value associated with the name of a set of configuration parameter. In locating configuration faults as broadly contemplated herein the Reference Configuration State (RCS) is considered to be correct. A non-faulty application and its configuration state acts as a RCS. It can be used to compare with configuration state of a faulty application and the difference in their configuration state will provide the configuration fault. Herein, this concept is built upon by exploiting the inherent similarity of the configuration parameters of the components to the overlapping resources. When components are configured to use a shared resource, the values of the configuration parameters are same irrespective of the type of component. The difference is in the configuration parameter <name> and how these configuration parameters are used by the components. Utilization of a configuration parameter by a component is "black-box" to the administrators/users of the component and does not directly contribute to the configuration fault. (In other words, the internal utilization of the configuration parameters by the components, for associating themselves with dependencies, is not exposed externally to administrators or users.) The only observable difference in a configuration parameter among different components is the <name>, and its semantics.

By way of appreciating a context of at least one embodiment of the invention, this is demonstrated through a simple real-world example in FIG. 1. Shown is the configuration (102) of two applications, Webservice identifiable by <Name, CRM> and Webservice identifiable by <Name,CustomerRelation>. They connect to the same data base through two different methods of configuration. Webservice deployed on 'WASServer' uses the DataSource to connect to the data base called 'CRMData'. Webservice deployed on 'ApplicationServer' uses the 'JDBCConnPool' to initiate a connection between the web-service and the same database. It can be seen that although both applications are connected to the same 'DataBase', the methods by which they are configured are different. However, the values of configuration parameters 'port, ipaddress, databasename' used by both the objects (JDBCconnpool and DataSource) is the same. This equivalence in the value of the configuration parameters is captured through a relationship involving their names. When a fault is observed in an application, its configuration state is compared with a RCS by utilizing these equivalence relationships. Differences observed between them will then identify the configuration faults to the shared resources.

In accordance with at least one embodiment of the invention, a process proceeds by identifying the shared resources/components among the application and creating a probing list for individual applications. For each application, the probe list includes all other applications that have overlapping resources. From the example above, the probing list for applications $A_1$ and $A_2$ will include the following:

$A_1$=[$A_2${Database,DB2,OS,Machine}]
$A_2$=[$A_1${Database,DB2,OS,Machine}]

For instance, $A_2$ acts as probe for $A_1$ for those resources that are shared among them and vise-versa. The list of components is then augmented with their configuration parameters, <name, value> pairs, as shown below:

$A_1$[Machine < IP, 10.0.0.1 >,OS < Type,Windows >,
WAS < InstallRoot, "c : /was >,
WASServer < Name, ServData > Webservice < Name,CRM >]
= [$A_2${Database < name,CRMData >,
DB2(< name,DBCRM >,< port, 60000 >),OS < type, windows >,
Machine < IP, 10.0.0.2 >}]
$A_2$ = [$A_1${Database < name, CRMData >,
DB2(< name,DBCRM >,< port, 60000 >),OS < type, windows >,
Machine < IP, 10.0.0.2 >}]

In accordance with at least one embodiment of the invention, an equivalence rule is further developed for the configuration parameters in different components that share the same resources. A sample equivalence rule for the example provided in FIG. 1 can accordingly be given as follows:

DataSource.DBName=JDBCConnPool.DataBase

These equivalence rules are stored along with their probing list to compute the differential configuration. In the above example, let it be assumed that the configuration state of $A_2$ has the following tuple <port, 61000> instead of <port, 60000>. If $A_2$ is observed to be faulty (through symptoms of misbehavior) then its difference with configuration state of $A_1$ whose tuple is <port, 60000> yields the faulty configuration.

In accordance with at least one embodiment of the invention, in modeling configuration nodes, a set of applications denoted by {$A_1 \ldots A_n$} correspondingly utilize a set of resources {$r_1 \ldots r_n$} each. Resources can be either physical systems such as databases, database instances, messaging components etc., or logical components that can be distinguished through a set of configuration parameters required for utilizing them. Dependencies among the resources are captured through a dependency graph, and the configuration $c_1 \ldots c_n$ between two resources is modeled as configuration nodes. For instance, in the example provided in FIG. 1, 'DataSource' is a part of the component 'WASServer' and it contains the configuration information for the web service to use the database. DataSource is modeled as a separate component. This separation of the concepts of configuration and the resource provides greater flexibility to identify the on/off faults (for resources) and configuration faults (on configuration nodes).

In accordance with at least one embodiment of the invention, each configuration node has a set of configuration parameters. Let {$p_i$=($n_{1i}$ $v_{i1} \ldots i_n$) $\ldots p_n$=($n_{ni}$, $v_{i1} \ldots i_n$)} be the set of configuration parameters (name with multiple values) for a configuration node. A reference configuration state is the set of all configurations parameters of the configuration nodes of a non-faulty application. Differential Configuration (DF) is obtained by comparing the values of the parameters of two configuration nodes by applying the equivalence rules. Formulation of the differential configuration between two configuration nodes ci and cj is given by $$v_{ik}=v_{j1} \forall k, l \text{ if } n_{1i}=n_{1j},$$

where $v_{ik}$ represents all the values of configuration parameters. The differential configuration matches the values of parameters for which the names are equivalent (through the equivalence rules).

Figures 2A, 2B:
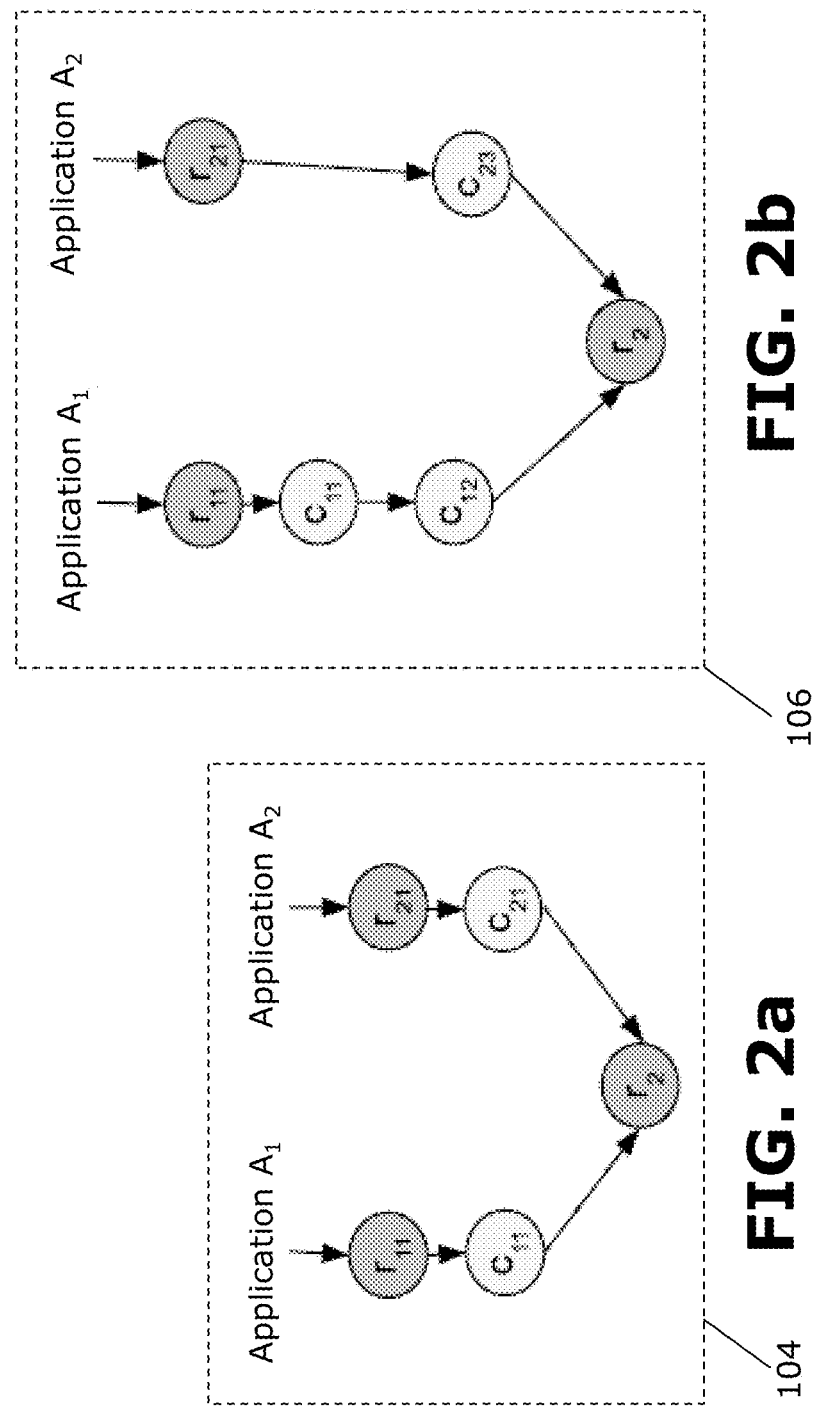
FIGS. 2a, 2b and 2c schematically illustrate different scenarios of configurations between resources.
Figure 2C:
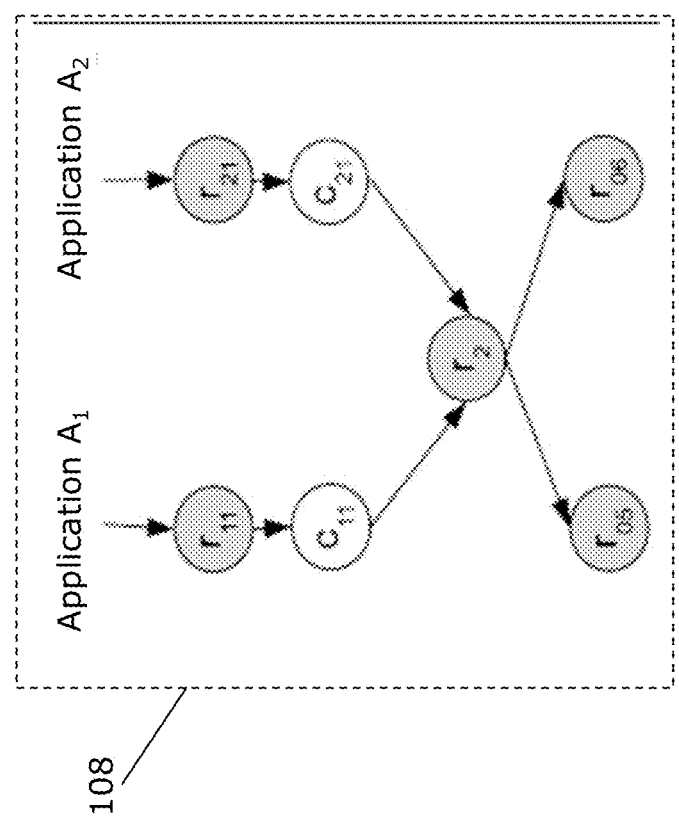

In accordance with at least one embodiment of the invention, FIGS. 2a-2c show different scenarios of configuration between resources. A first case, in FIG. 2a, shows a simple configuration scenario (104) of a shared resource between two applications $A_1$ and $A_2$. $c_{11}$ and $c_{21}$ are the nodes that model the configuration component that links the resources $r_{11}$ and $r_{21}$ to the shared resource $r_2$ respectively. If $A_1$ is observed to be faulty (i.e., not functionally working), it is feasible that either of the resources $r_{11}$, $r_2$ are down/off or $c_{11}$ does not posses a correct configuration value. If $A_2$ is working (i.e., functionally responding correctly) it can be concluded that $r_2$ is functionally correct and up. The problem can be localized to either $r_{11}$ or $c_{11}$. If $c_{11}$ is misconfigured, then differential configuration of the components $c_{11}$ and $c_{21}$ will isolate the fault to $c_{11}$. Otherwise the fault will be contained within $r_{11}$.

In accordance with at least one embodiment of the invention, FIG. 2b shows a second case, which is a configuration scenario (106) where several configurations $c_{11}$, $c_{12}$ exists to utilize a resource $r_2$ by application $A_1$, while there exists logically a single configuration unit $C_{21}$ between the components $r_{11}$ and $r_2$. If $A_1$ is faulty (observed through symptoms), a fault can be either localized to $r_2$ or $r_{11}$ (as being down or functionally not correct) or due to misconfiguration of $c_{12}$ and $C_{11}$. If $A_2$ is up and functionally working, it is due to the misconfiguration of $c_{11}$, $c_{12}$ or due to $r_{11}$. Equivalence rules are used to isolate the misconfiguration fault. Otherwise, the fault can be localized to $r_2$.

In accordance with at least one embodiment of the invention, FIG. 2c shows a third case, which is a dynamic configuration scenario (108) as seen in a load balancer/dynamic routing. It is the most difficult of the three configuration scenarios (104/106/108) but quite common in data center/cloud environments. The resources shared between the applications $A_1$ and $A_2$ are $r_2$, $r_{05}$ and $r_{06}$. For each request from the applications, either $r_{05}$ or $r_{06}$ is used based on the value returned by $r_2$. As each request is dynamically chosen to be redirected to either $r_{05}$ or $r_{06}$ at run time, it poses challenges in identifying a configuration fault with a single request/response scenario. Let it be assumed that there is a scenario where $A_1$ shows faulty behavior either consistently or occasionally. If $A_2$ (with equal probability as $A_2$ that its request will be routed to $r_{05}$ and $r_{06}$) functions correctly then it leaves with just the resource $r_{11}$ or its configuration node $c_{11}$ as nodes that contains the fault. The differential configuration information between $c_{11}$ and $c_{12}$ will show whether the $c_{11}$ has a configuration fault.

In accordance with at least one embodiment of the invention, in all the above cases, as discussed in connection with FIGS. 2a, 2b and 2c by way of example, if there exists no RCS, then the fault in a application can still be localized to either the configuration node to the shared resources or the shared resources among the faulty applications.

In accordance with at least one embodiment of the invention, a method for using differential configuration to identify configuration faults (such as those types of faults presented above) employs the following: discovery of resource and configuration nodes; equivalence rules; overlapping resources discovery; identifying reference state in shared environment; and identifying configuration faults. In discovering resource and configuration nodes, configuration nodes that model the configuration between two resources are employed. To elicit the configuration nodes, resources utilized by an application are identified, and this is done through a process of discovery that involves identifying resources, configurations and dependencies among them. A wide variety of tools can be employed in the discovery of resources and their configuration information (and configuration parameters); by way of example, one such commercially available tool is the TADDM (the Tivoli Application Dependency Discovery Manager developed by IBM of Armonk, N.Y.; see, e.g., http://www-306.ibm.com/software/tivoli/products/taddm) that discovers various configuration and relationships, and stores them in a repository.

Figure 3:
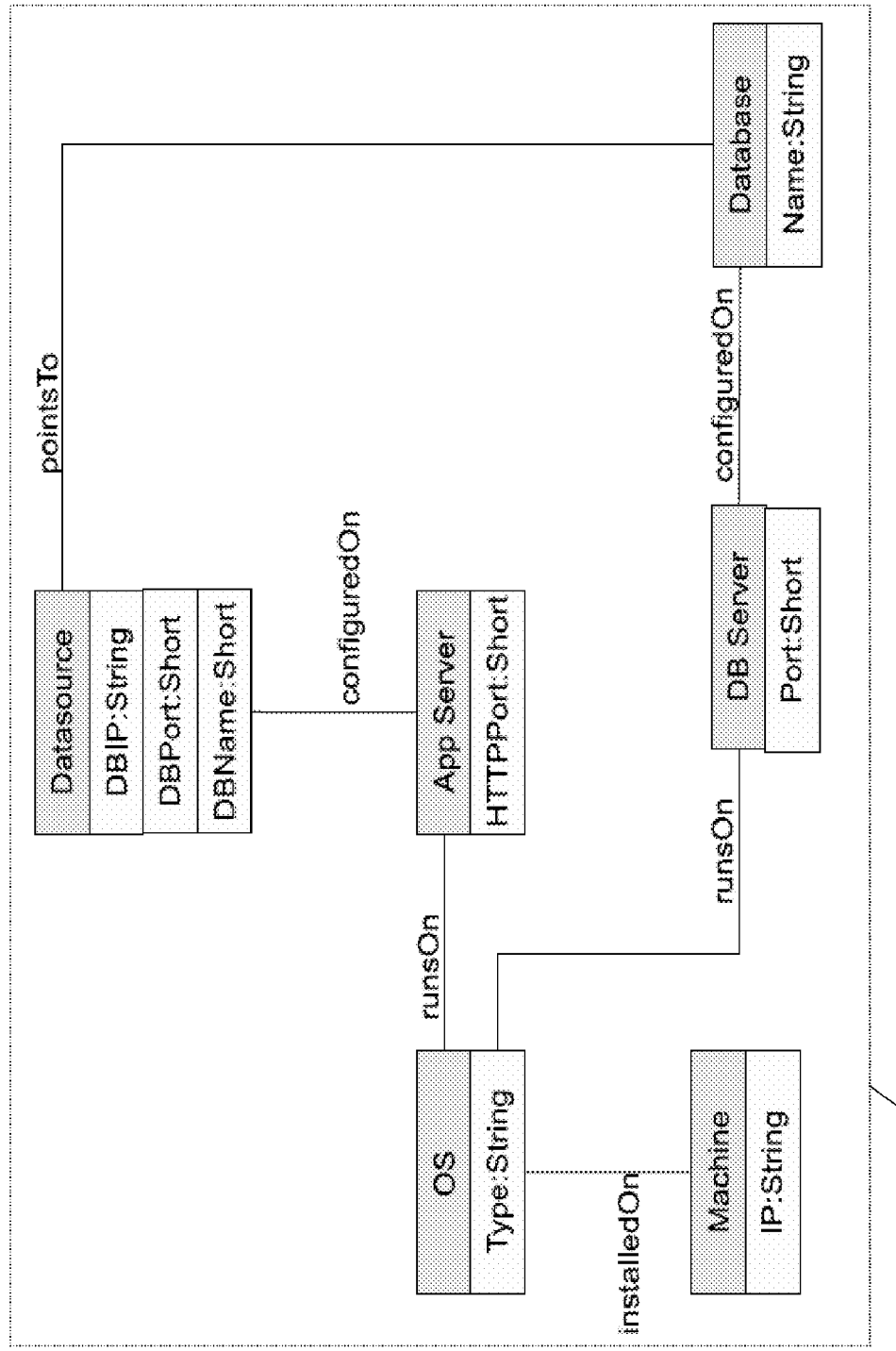
FIG. 3 schematically illustrates a partial metamodel of configuration information.

In accordance with at least one embodiment of the invention, FIG. 3 illustrates a partial metamodel (110) of configuration information provided by a tool such as one of those just described. Configuration parameters in the resources are categorized as 'independent attributes' and 'dependent attributes'. An independent attribute refers to an attribute of an element type in the configuration meta-model, that can be configured independent of other resources and does not affect the functionality of its dependents. Values such as IP addresses, ports of server components, user name/password, memory etc., are examples of few such components. In the example of FIG. 3, examples of independent attributes include Machine.IP, AppServer.HTTPPort, DBServer.Port, etc. On the other hand, a dependent attribute is an element type in the meta-model, if and only if the value of the attribute can be derived from the value of another attribute in a given model. They are modeled as configuration node as they are required for one require to get configured to another resource and utilize it. In FIG. 3, Datasource.DBPort is an example of dependent attribute, as the value of DBPort attribute of a Datasource has a path named pointsTo.configuredOn.

In a framework in accordance with at least one embodiment of the invention, knowledge about deriving these values is represented by constraints. FIG. 4 shows an example of a set of constraints (112), presented in OCL (object constraint language), in the context of Datasource. The rule implies that for a configuration node named 'DataSource', there are three dependent parameters namely DBName, DBPort, DBIP, whose values need to be derived by applying the constraint on the discovered dependency topology information. These configuration nodes are thus derived using this knowledge (i.e., constraint). In accordance with embodiments herein, an extensible list of independent attributes and dependent attributes is developed. The list of attributes can be extended as models for new products are added. Discovery tools can identify all the resources and relationship among them pertaining to the meta-model. Configuration nodes are further identified from this dependency list utilizing the constraints.

In accordance with at least one embodiment of the invention, in attending to equivalence rules, it can be recognized that it is commonly the case that resources utilizing the shared resources can be of different types, such that the configuration nodes are different. In this case, equivalence rules are developed to capture the similarity of the values. These rules helps to determine the differential configuration between two configuration nodes that are configured to used the same resource. For instance, in FIG. 1, with the DataBase instance being used by both jdbcconnectionpool and DataSource, it should be feasible to compute the equivalence of the configuration parameters for these two configuration nodes. Equivalence rules are formulated in the same way as dependent attributes, which specify the relationship between two configuration attributes of a configuration node.

In accordance with at least one embodiment of the invention, FIG. 5 shows an example (114) of a relationship between configuration nodes of jdbcconnectionpool and DataSource in OCL. The example 114 relates three parameters of the DataSource configuration node to three parameters of jdbc-connectionpool. In some cases, the equivalence rules can be nested. Inasmuch as equivalence rules are domain specific, a framework in accordance with embodiments of the invention permits experts to add such knowledge.

In accordance with at least one embodiment of the invention, by way of identifying overlapping resources, it is to be noted that each application is associated with a dependency graph including resource and configuration nodes. Thus, in identifying overlapping resources, an aim is to determine the set of resources shared by each application with others. In accordance with a two-stage algorithm, a first stage (116) is shown in FIG. 6. Here, a set of subgraphs is derived for each of the dependency graphs. Particularly, a brute force algorithm here takes a graph G and computes all the subgraphs in G. First, there is computed an upper bound on the number of combinations that can be obtained from a graph of size N(nodes) (line 2). For N nodes, the number of combinations possible is $2^N-1$. A combination of nodes is a subgraph if it satisfies the connectivity property. Line 5 checks if a combination is connected. A graph is said to be connected if each vertex has a path to all other vertices.

In a second stage of the two-stage algorithm, in accordance with at least one embodiment of the invention, matching subgraphs are found with other applications. In other words, for each subgraph obtained in the algorithm (stage) 116 of FIG. 6, a determination is made as to whether there is a matching sub-graph generated from another application. By way of an illustrative and non-restrictive example, this step can be mapped to a graph isomorphism problem. Inasmuch as a wide variety of algorithms can be adopted for determining graph isomorphism, an illustrative example is one presented in R. Czerwinski, 'A polynomial time algorithm for graph isomorphism', CoRR, abs/0711.2010, 2007 (http://arxiv.org/abs/0711.2010). Accordingly, by employing suitable algorithms for subgraph and isomorphism identification, overlapping resources are determined.

Figure 7:
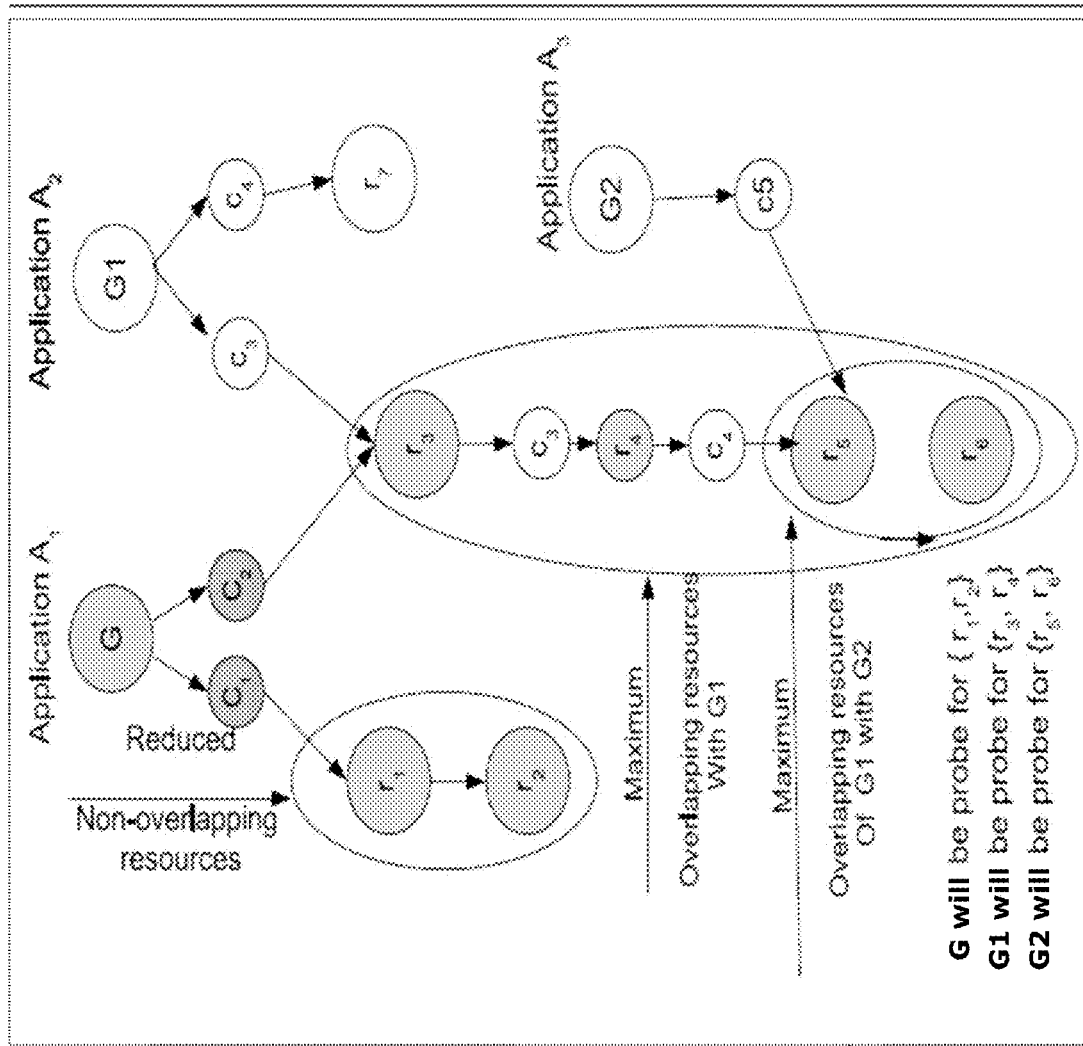
FIG. 7 schematically illustrates a set of overlapping resources.

As such, in accordance with at least one embodiment of the invention, it may well be determined that there are multiple applications with which the same set (or subset of the set) of resources are shared. FIG. 7 shows this scenario (118), where applications $A_1, A_2, A_3$ share a set of resources. If their dependency graph is G, $G_1$, $G_2$, then in the present example $G_1$ can be probed for resources $r_3, r_4, r_5, r_6$ or $r_3, r_4$, as resources $r_6, r_7$ are also shared with $G_2$. It should be appreciated that choosing different granularities of the resource sharing has varying implications on fault localization, depending on which applications fail. By way of a non-restrictive example, one can choose to retain the smallest granularity of resources shared so as to increase the number of configuration nodes in which a fault can be isolated.

By way of identifying a reference state in a shared environment, in accordance with at least one embodiment of the invention, it should be noted that in order to localize a fault, a set of applications is determined that can be utilized as a reference set, wherein this reference set has correct configurations. It is then observed as to whether applications sharing the resources show faulty behavior. If no fault is observed on applications that are sharing resources, then those applications are considered as a reference configuration for those resources shared between them. Probes written by domain experts can also be triggered to determine the correct functionality of the application, by way of complementing approaches broadly contemplated herein.

By way of identifying configuration faults in accordance with at least one embodiment of the invention, for each application, after identifying the isomorphic graphs (i.e., other applications with which an application shares resources), the application is stored along with the other applications with which they share the resources. When an application is observed to be faulty, the probe list is consulted to identify the applications that share resources with the faulty application. If the applications in the probe list are functional, the configuration nodes of these applications to the shared resources are used to compute the differential configuration with the configuration nodes in the faulty application. If a difference in the configuration state is observed, then the configuration fault can be pinpointed.

Otherwise, in accordance with at least one embodiment of the invention, the fault can be localized to resources that are not shared with any application. If there exist multiple applications sharing the same set of resources, the applications are utilized to increase the number of applications sharing distinct set of resources by changing the number of resources shared with those applications. For instance, in accordance with the example (118) of FIG. 7, it can be assumed that $A_4$ shares $(r_3, c_4, r_4, r_5)$ with $A_1$. $A_4$ increases the confidence with which a configuration fault in $c_2$ can be detected. If resources shared between $A_1$ and $A_4$ are reduced to $(r_4, r_5)$ instead of $(r_3, c_4, r_4, r_5)$, it can then be noted that since $c_3$ becomes a configuration unit of $A_1$ for using the resources in $r_4$ and $r_5$ and is not shared by $A_2$, a fault in $c_3$ is identifiable. In this case, $A_4$ is chosen to act as an additional probe via modeling its sharing of resources with $r_4$ rather than with $r_3$.

Figure 8:
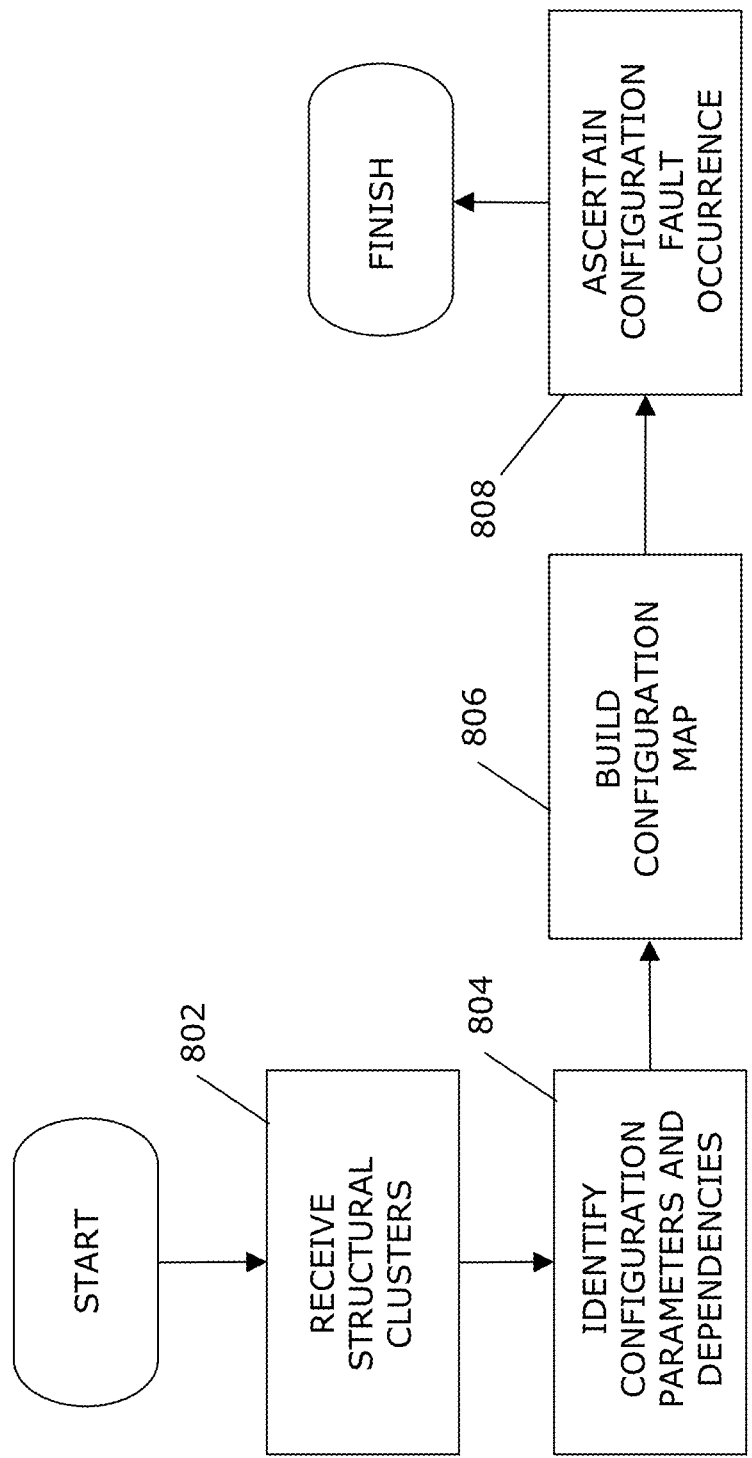
FIG. 8 sets forth a process more generally for fault localization.

FIG. 8 sets forth a process more generally for fault localization, in accordance with at least one embodiment of the invention. It should be appreciated that a process such as that broadly illustrated in FIG. 8 can be carried out on essentially any suitable computer system or set of computer systems, which may, by way of an illustrative and on-restrictive example, include a system such as that indicated at 12' in FIG. 9. In accordance with an example embodiment, most if not all of the process steps discussed with respect to FIG. 8 can be performed by way a processing unit or units and system memory such as those indicated, respectively, at 16' and 28' in FIG. 9.

As shown in FIG. 8, structural clusters for an environment are received (802), and configuration parameters and dependencies for components in the structural clusters are identified (804). A configuration map is built (806), and a configuration fault occurrence is ascertained (808).

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
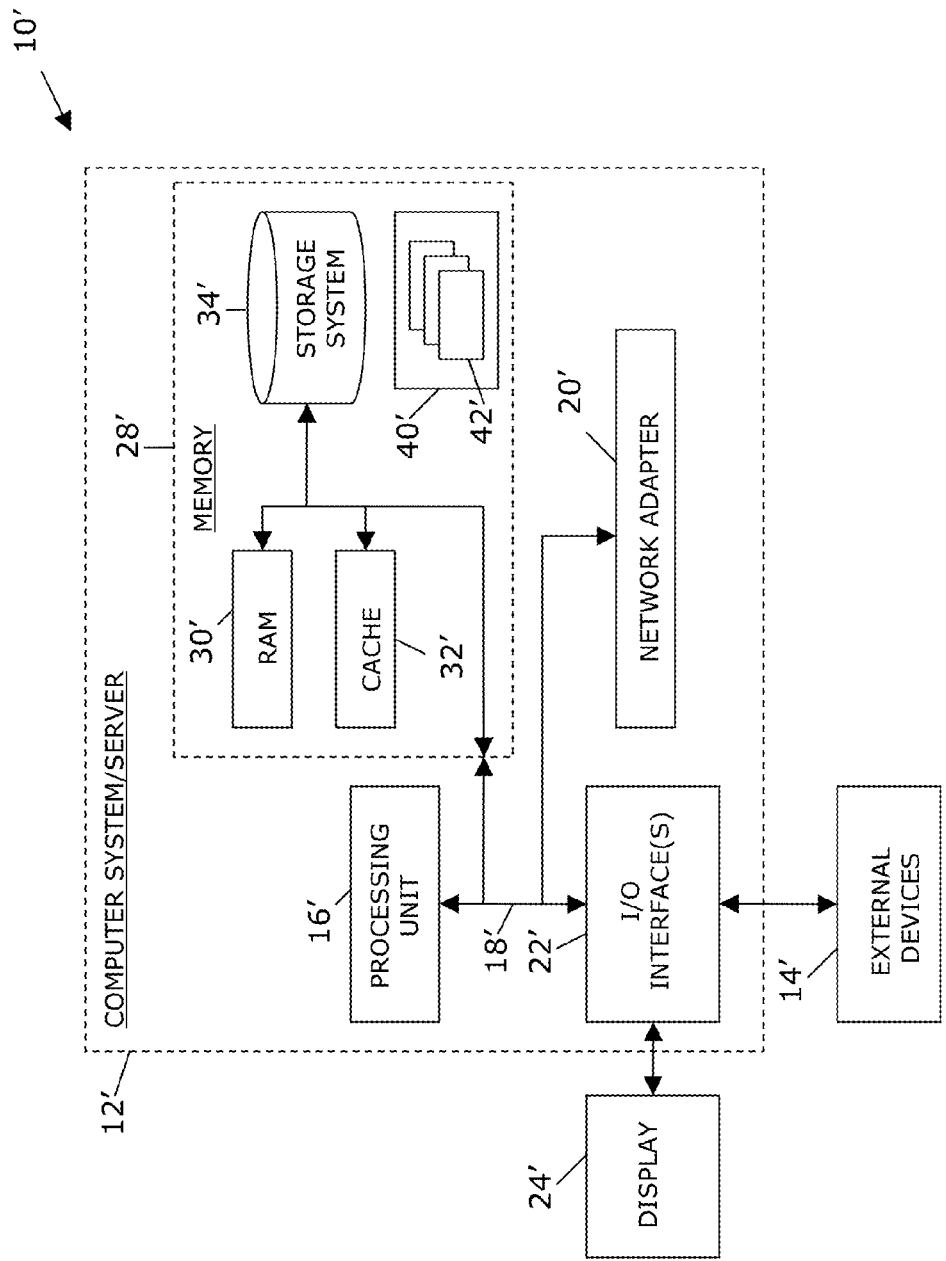
FIG. 9 illustrates a computer system.

Referring now to FIG. 9, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove.

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

Figure 10:
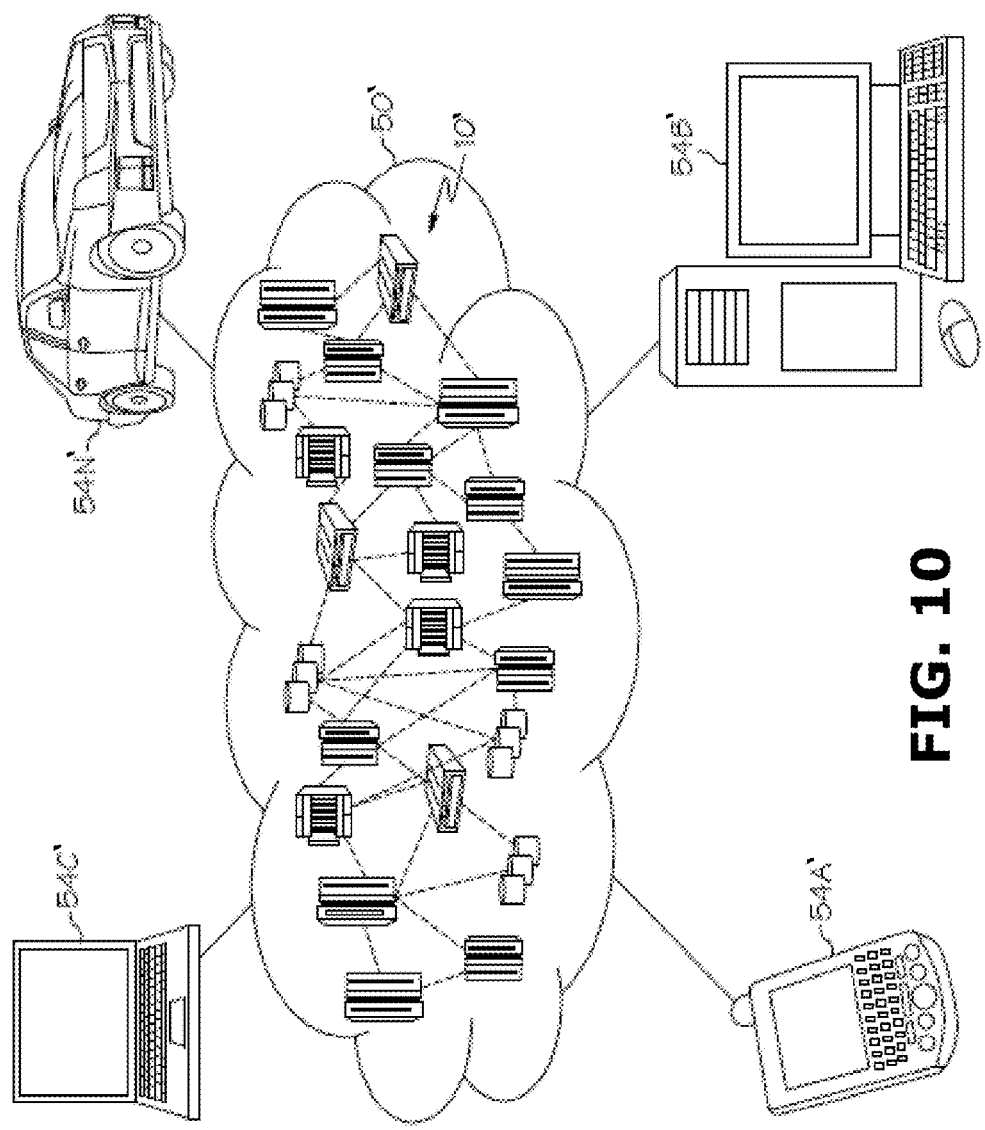
FIG. 10 depicts a cloud computing environment.

Referring now to FIG. 10, illustrative cloud computing environment 50' is depicted. As shown, cloud computing environment 50' comprises one or more cloud computing nodes 10' with which local computing devices used by cloud consumers, such as, for example, personal digital assistant (PDA) or cellular telephone 54A,' desktop computer 54B', laptop computer 54C', and/or automobile computer system 54N' may communicate. Nodes 10' may communicate with one another. They may be grouped (not shown) physically or virtually, in one or more networks, such as Private, Community, Public, or Hybrid clouds as described hereinabove, or a combination thereof. This allows cloud computing environment 50' to offer infrastructure, platforms and/or software as services for which a cloud consumer does not need to maintain resources on a local computing device. It is understood that the types of computing devices 54A'-N' shown in FIG. 2 are intended to be illustrative only and that computing nodes 10' and cloud computing environment 50' can communicate with any type of computerized device over any type of network and/or network addressable connection (e.g., using a web browser).

Figure 11:
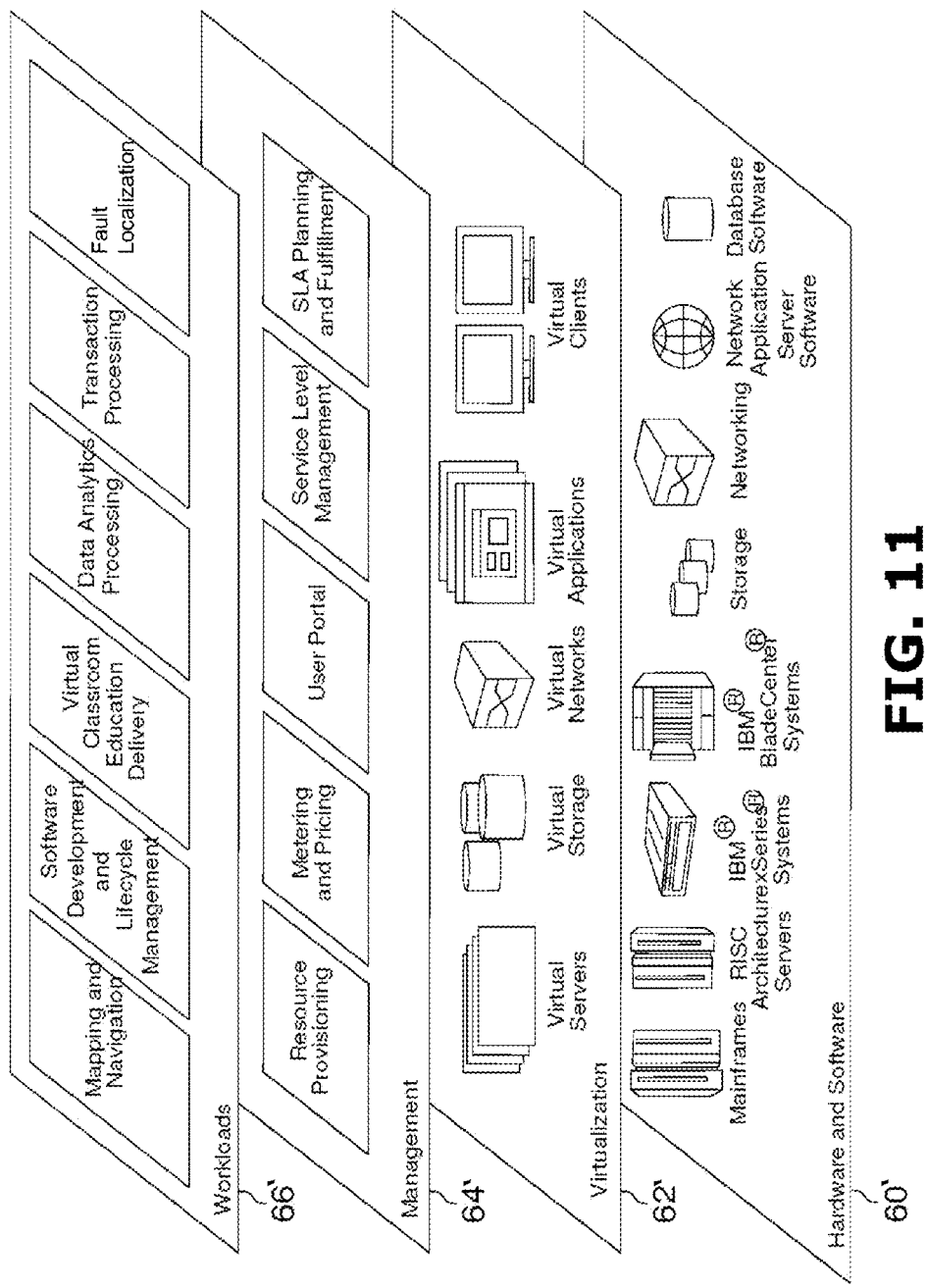
FIG. 11 depicts an abstraction model.

Referring now to FIG. 11, a set of functional abstraction layers provided by cloud computing environment 50' (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60' includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide.)

Virtualization layer 62' provides an abstraction layer from which the following examples of virtual entities may be provided: virtual servers; virtual storage; virtual networks, including virtual private networks; virtual applications and operating systems; and virtual clients.

In one example, management layer 64' may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66' provides examples of functionality for which the cloud computing environment may be utilized. Examples of workloads and functions which may be provided from this layer include: mapping and navigation; software development and lifecycle management; virtual classroom education delivery; data analytics processing; transaction processing; and fault localization (e.g., as broadly contemplated herein in accordance with at least one embodiment of the invention).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
receiving structural clusters for an environment, each structural cluster comprising an application;
identifying configuration parameters and dependencies for components in the structural clusters;
said identifying comprising:
creating a probing list with respect to an application, the probing list indicating at least one other application sharing at least one common resource with the application; and
developing an equivalence rule for at least one configuration parameter with respect to the at least one common resource shared between the application and the at least one other application, wherein the equivalence rule indicates an equivalence in value for the at least one configuration parameter with respect to the at least one common resource shared between the application and the at least one other application; and
ascertaining a configuration fault occurrence via utilizing the probing list and equivalence rule, and comparing a configuration state of the application with a configuration state of the at least one other application;
said ascertaining comprising computing a differential configuration to determine a faulty configuration.

2. The method according to claim 1, wherein said receiving comprises receiving resource intersection clusters.

3. The method according to claim 2, wherein said receiving of resource intersection clusters comprises receiving modeling information.

4. The method according to claim 1, comprising building a configuration map which maps configuration parameters across at least one taken from the group consisting of: components of similar type, components of similar functional classification.

5. The method according to claim 1, wherein said identifying comprises:

associating an application with a dependency graph and deriving at least one subgraph for the dependency graph;

matching the at least one subgraph with at least one subgraph of another application.

6. The method according to claim 5, wherein said ascertaining further comprises storing applications with matching subgraphs.

7. The method according to claim 6, wherein said ascertaining further comprises:

observing a faulty application among the stored applications; and observing a difference in configuration states between stored applications.

8. The method according to claim 1, wherein said ascertaining comprises running a test for each structural cluster to identify at least one taken from the group consisting of: a faulty component, presence of a faulty configuration.

9. The method according to claim 1, further comprising assimilating configuration fault elicitation rules.

10. The method according to claim 9, wherein said ascertaining comprises running the fault elicitation rules and identifying at least one specific configuration fault.

11. The method according to claim 1, wherein the environment is a cloud environment.

12. An apparatus comprising:

at least one processor; and a computer readable storage medium having computer readable program code embodied therewith and executable by the at least one processor, the computer readable program code comprising:

computer readable program code configured to receive structural clusters for an environment, each structural cluster comprising an application;

computer readable program code configured to identify configuration parameters and dependencies for components in the structural clusters, via:

creating a probing list with respect to an application, the probing list indicating at least one other application sharing at least one common resource with the application; and developing an equivalence rule for at least one configuration parameter with respect to the at least one common resource shared between the application and the at least one other application, wherein the equivalence rule indicates an equivalence in value for the at least one configuration parameter with respect to the at least one common resource shared between the application and the at least one other application; and computer readable program code configured to ascertain a configuration fault occurrence via utilizing the probing list and equivalence rule, and comparing a configuration state of the application with a configuration state of the at least one other application;

wherein the ascertaining comprises computing a differential configuration to determine a faulty configuration.

13. A computer program product comprising:

a non-transitory computer readable storage medium having computer readable program code embodied therewith, the computer readable program code comprising:

computer readable program code configured to receive structural clusters for an environment, each structural cluster comprising an application;

computer readable program code configured to identify configuration parameters and dependencies for components in the structural clusters, via:

creating a probing list with respect to an application, the probing list indicating at least one other application sharing at least one common resource with the application; and developing an equivalence rule for at least one configuration parameter with respect to the at least one common resource shared between the application and the at least one other application, wherein the equivalence rule indicates an equivalence in value for the at least one configuration parameter with respect to the at least one common resource shared between the application and the at least one other application; and computer readable program code configured to ascertain a configuration fault occurrence via utilizing the probing list and equivalence rule, and comparing a configuration state of the application with a configuration state of the at least one other application;

wherein the ascertaining comprises computing a differential configuration to determine a faulty configuration.

14. The computer program product according to claim 13, wherein said computer readable program code is configured to receive resource intersection clusters.

15. The computer program product according to claim 14, wherein said computer readable program code is configured to receive modeling information.

16. The computer program product according to claim 13, wherein said computer readable program code is configured to build a configuration map which maps configuration parameters across at least one taken from the group consisting of: components of similar type, components of similar functional classification.

17. The computer program product according to claim 13, wherein computer readable program code is configured to:

associate an application with a dependency graph and derive at least one subgraph for the dependency graph; and match the at least one subgraph with at least one subgraph of another application.

18. The computer program product according to claim 17, computer readable program code is further configured to applications with matching subgraphs.

19. The computer program product according to claim 18, computer readable program code is further configured to:

observe a faulty application among the stored applications; and observe a difference in configuration states between stored applications.

20. The computer program product according to claim 13, wherein said computer readable program code is configured to run a test for each structural cluster to identify at least one taken from the group consisting of: a faulty component, presence of a faulty configuration.

21. The computer program product according to claim 13, wherein said computer readable program code is further configured to assimilate configuration fault elicitation rules.

22. The computer program product according to claim 21, wherein said computer readable program code is configured to run the fault elicitation rules and identify at least one specific configuration fault.

23. The computer program product according to claim 13, wherein the environment is a cloud environment.

* * * * *